(12) United States Patent
Lim et al.

(10) Patent No.: US 12,706,347 B2
(45) Date of Patent: Aug. 11, 2026

(54) SECONDARY BATTERY

(71) Applicant: LG Energy Solution, Ltd., Seoul (KR)

(72) Inventors: Hun-Hee Lim, Daejeon (KR); Sang-Hun Kim, Daejeon (KR); Min-Hyeong Kang, Daejeon (KR); Dae-Woong Song, Daejeon (KR); Hyung-Kyun Yu, Daejeon (KR); Soo-Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 599 days.

(21) Appl. No.: 18/035,232

(22) PCT Filed: Apr. 15, 2022

(86) PCT No.: PCT/KR2022/005502

§ 371 (c)(1), (2) Date: May 3, 2023

(87) PCT Pub. No.: WO2022/220655

PCT Pub. Date: Oct. 20, 2022

(65) Prior Publication Data

US 2024/0014506 A1 Jan. 11, 2024

(30) Foreign Application Priority Data

Apr. 15, 2021 (KR) ........................ 10-2021-0049364

(51) Int. Cl.
*H01M 50/375* (2021.01)
*H01M 50/105* (2021.01)
*H01M 50/342* (2021.01)

(52) U.S. Cl.
CPC ....... *H01M 50/375* (2021.01); *H01M 50/105* (2021.01); *H01M 50/3425* (2021.01)

(58) Field of Classification Search
CPC ............. H01M 10/052; H01M 50/105; H01M 50/121; H01M 50/129; H01M 50/178;
(Continued)

(56) References Cited

U.S. PATENT DOCUMENTS

2003/0148173 A1 8/2003 Gu
2008/0233468 A1 9/2008 Otohata et al.
(Continued)

FOREIGN PATENT DOCUMENTS

CN 204793061 U 11/2015
JP 2001093489 A 4/2001
(Continued)

OTHER PUBLICATIONS

International Search Report for PCT/KR2022/005502 mailed Aug. 1, 2022. 3 pages.
(Continued)

*Primary Examiner* — Victoria H Lynch
(74) *Attorney, Agent, or Firm* — Lerner David LLP

(57) ABSTRACT

Disclosed herein is a secondary battery having a vent member. The secondary battery may include an electrode assembly, a case for accommodating the electrode assembly and a vent member. The vent member is configured to protrude to the outside of the case, and one end of the vent member protruding to the outside of the case is joined to an outer side of the case.

19 Claims, 3 Drawing Sheets

(58) Field of Classification Search
CPC .. H01M 50/186; H01M 50/193; H01M 50/30; H01M 50/342; H01M 50/3425; H01M 50/375; H01M 50/55; H01M 50/553; H01M 50/557; Y02E 60/10
See application file for complete search history.

(56) References Cited

U.S. PATENT DOCUMENTS

| | | | | |
|---|---|---|---|---|
| 2010/0239895 | A1 | 9/2010 | Yang et al. | |
| 2012/0160728 | A1* | 6/2012 | Brebion | B29C 48/3363 156/229 |
| 2014/0120387 | A1 | 5/2014 | Kinuta et al. | |
| 2016/0197318 | A1* | 7/2016 | Yamashita | H01M 50/193 429/185 |
| 2018/0062148 | A1 | 3/2018 | Cho et al. | |
| 2020/0111999 | A1 | 4/2020 | Kim et al. | |
| 2020/0136167 | A1* | 4/2020 | Park | H01M 4/662 |
| 2022/0140425 | A1 | 5/2022 | Lee et al. | |

FOREIGN PATENT DOCUMENTS

| | | | |
|---|---|---|---|
| JP | 2001283800 | A | 10/2001 |
| JP | 2005116474 | A | 4/2005 |
| JP | 2006054099 | A | 2/2006 |
| JP | 2017062872 | A | 3/2017 |
| JP | 2018506159 | A | 3/2018 |
| JP | 2020015221 | A | 1/2020 |
| KR | 20030066895 | A | 8/2003 |
| KR | 20080036257 | A | 4/2008 |
| KR | 20140053010 | A | 5/2014 |
| KR | 20150055775 | A | 5/2015 |
| KR | 20150061996 | A | 6/2015 |
| KR | 101614185 | B1 | 4/2016 |
| KR | 101653305 | B1 | 9/2016 |
| KR | 20180071982 | A | 6/2018 |
| KR | 20190042215 | A | 4/2019 |
| KR | 20190047104 | A | 5/2019 |
| KR | 102159368 | B1 | 9/2020 |
| KR | 20200114784 | A | 10/2020 |
| WO | 2018088257 | A1 | 5/2018 |

OTHER PUBLICATIONS

Ren, Yi et al., “Different Dependence of Tear Strength on Film Orientation of LLDPE Made with Different Co-Monomer”, Polymers, vol. 11, 3, 434. Mar. 6, 2019, doi:10.3390/polym11030434.

Extended European Search Report including Written Opinion for Application No. 22788510.0 dated Jan. 8, 2025. 9 pages.

Search Report dated Mar. 19, 2026 from the Office Action for Chinese Application No. 202280007436.6 issued Mar. 21, 2026, pp. 1-3.

* cited by examiner

SECONDARY BATTERY

CROSS-REFERENCE TO RELATED APPLICATIONS

The present application is a national phase entry under 35 U.S.C. § 371 of International Application No. PCT/KR2022/005502 filed on Apr. 15, 2022, which claims priority to Korean Patent Application No. 10-2021-0049364 filed on Apr. 15, 2021, the disclosures of which are incorporated herein by reference in their entireties.

TECHNICAL FIELD

The present disclosure relates to a secondary battery, and more particularly, to a secondary battery having a vent member.

BACKGROUND ART

Secondary batteries are highly applicable to various products and exhibit superior electrical properties such as high energy density, etc. Secondary batteries are commonly used not only in portable devices but also in electric vehicles (EVs) or hybrid electric vehicles (HEVs) driven by electrical power sources. The secondary battery is drawing attention as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like.

The secondary battery generally has a structure in which an electrode assembly including at least one unit cell having a positive electrode/separator/negative electrode structure is accommodated in a case of a laminate sheet in which an outer layer, a metal barrier layer and a sealant layer are sequentially laminated, and a sealant resin of the sealant layer is fused to seal the electrode assembly is sealed.

In the conventional secondary battery, the battery may ignite due to various causes such as a short circuit inside the secondary battery, overcharge or overdischarge, temperature control, or the like. At this time, thermal propagation where the temperature inside the secondary battery rises rapidly and simultaneously the heat is transferred to neighboring cells may be generated, which may further increase the fire.

In order to minimize damage to the electrode caused by gas when thermal propagation occurs—i.e., when the internal temperature of the secondary battery rises, directional venting characteristic is required to discharge the gas in one direction. However, the conventional secondary battery has a problem in that it is difficult to induce gas discharge in a specific direction.

Therefore, the present disclosure is directed to providing a secondary battery with improved safety by inducing gas discharge in a specific direction.

DISCLOSURE

Technical Problem

The present disclosure is directed to providing a secondary battery with improved safety by inducing gas discharge in a specific direction.

Technical Solution

In one aspect of the present disclosure, there are provided secondary batteries according to the following embodiments.

The first embodiment provides a secondary battery, comprising: an electrode assembly, a case for accommodating the electrode assembly; and a vent member, wherein the vent member is configured to protrude to the outside of the case, and one end of the vent member protruding to the outside of the case is joined to an outer side of the case.

In the second embodiment according to the first embodiment, a part of the vent member protruding to the outside of the case may be bent so that one end of the vent member protruding to the outside of the case is joined to the outer side of the case.

In the third embodiment according to the first embodiment or the second embodiment, the case may include an accommodation portion for accommodating the electrode assembly and a sealing portion containing a sealant resin and formed to seal the electrode assembly, and one end of the vent member protruding to the outside of the case may be joined to the outer side of the case corresponding to a region inside the accommodation portion where the electrode assembly is not located.

In the fourth embodiment according to the third embodiment, the other end of the vent member may be located in the sealing portion.

In the fifth embodiment according to the fourth embodiment, an electrode lead may be attached to the electrode assembly, and the other end of the vent member may be located in the sealing portion at a side where the electrode lead is exposed to the outside.

In the sixth embodiment according to the fourth or fifth embodiment, an electrode lead may be attached to the electrode assembly, and the other end of the vent member may be located in the sealing portion at a corner where the electrode lead is exposed to the outside.

In the seventh embodiment according to any one of the third to sixth embodiments, the vent member may have a lower melting point than the sealant resin.

In the eighth embodiment according to any one of the first to seventh embodiments, the vent member may be vented at 100° C. to 120° C.

In the ninth embodiment according to the eighth embodiment, the vent member may be vented at a pressure of 1.5 atm or above.

In the tenth embodiment according to any one of the first to ninth embodiments, the vent member may have a maximum sealing strength of less than 6 kgf/15 mm at 100° C. or above.

In the eleventh embodiment according to any one of the first to tenth embodiments, the vent member may have an average sealing strength of less than 4.5 kgf/15 mm at 100° C. or above.

In the twelfth embodiment according to any one of the first to eleventh embodiments, the vent member may have a maximum sealing strength of 6 kgf/15 mm or more at room temperature to 60° C.

In the thirteenth embodiment according to any one of the first to twelfth embodiments, the vent member may have an average sealing strength of 4.5 kgf/15 mm or more at room temperature to 60° C.

In the fourteenth embodiment according to any one of the first to thirteenth embodiments, the vent member may contain a linear low-density polyethylene having a comonomer with a carbon number of 6 or more.

In the fifteenth embodiment according to the fourteenth embodiment, the linear low-density polyethylene having a comonomer with a carbon number of 6 or more may be polymerized in the presence of a metallocene catalyst.

In the sixteenth embodiment according to the fourteenth or fifteenth embodiment, in the linear low-density polyethylene having a comonomer with a carbon number of 6 or more, a content of the comonomer with a carbon number of 6 or more may be 15 weight % or less, based on 100 weight % of the linear low-density polyethylene having a comonomer with a carbon number of 6 or more.

In the seventeenth embodiment according to any one of the fourteenth to sixteenth embodiments, the linear low-density polyethylene having a comonomer with a carbon number of 6 or more may have a poly dispersity index (PDI) of 4 or less.

In the eighteenth embodiment according to any one of the fourteenth to seventeenth embodiments, the case may include a sealing portion containing a sealant resin and formed to seal the electrode assembly, and a difference between a crystallization temperature of the sealant resin and a crystallization temperature of the linear low-density polyethylene having a comonomer with a carbon number of 6 or more may be 10° C. or less.

In the nineteenth embodiment according to the eighteenth embodiment, the linear low-density polyethylene having a comonomer with a carbon number of 6 or more may have a crystallization temperature of 90° C. to 115° C.

In the twentieth embodiment according to any one of the fourteenth to nineteenth embodiments, the linear low-density polyethylene having a comonomer with a carbon number of 6 or more may have a weight-average molecular weight of 100,000 g/mol to 400,000 g/mol.

In the twenty first embodiment according to any one of the first to twentieth embodiments, the vent member may have a melting point of 100° C. to 130° C.

In the twenty second embodiment according to any one of the first to twenty first embodiments, the secondary battery may be a pouch-type secondary battery.

Advantageous Effects

In the secondary battery according to an embodiment of the present disclosure, one end of the vent member protruding to the outside of the case and joined to the outer side of the case is pulled when the battery swells, thereby inducing a vent more quickly. Accordingly, the safety of the battery may be improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 1 is a plan view of a secondary battery according to an embodiment of the present disclosure.

BEST MODE

Figure 2:
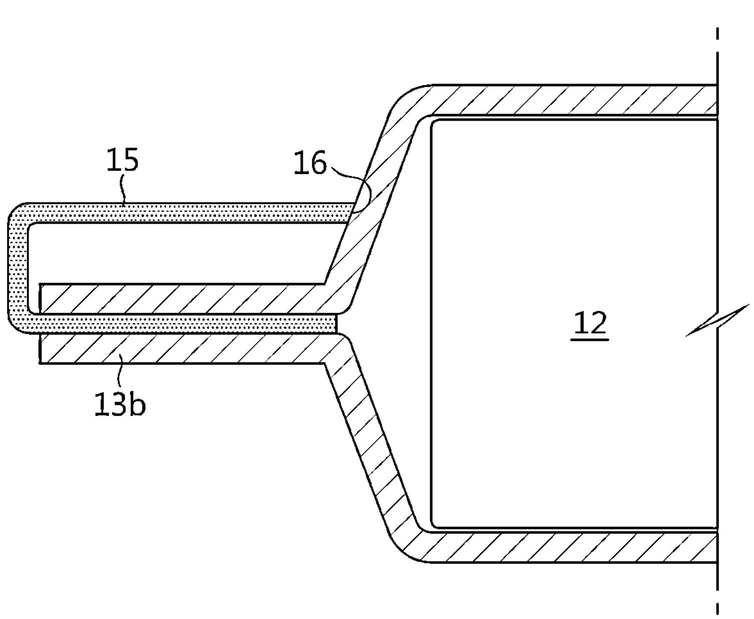
FIG. 2 is a cross-sectional view, taken along the line A-A' of FIG. 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

A secondary battery according to an embodiment of the present disclosure includes an electrode assembly, a case for accommodating the electrode assembly; and a vent member, wherein the vent member is configured to protrude to the outside of the case, and one end of the vent member protruding to the outside of the case is joined to an outer side of the case.

Figure 1:
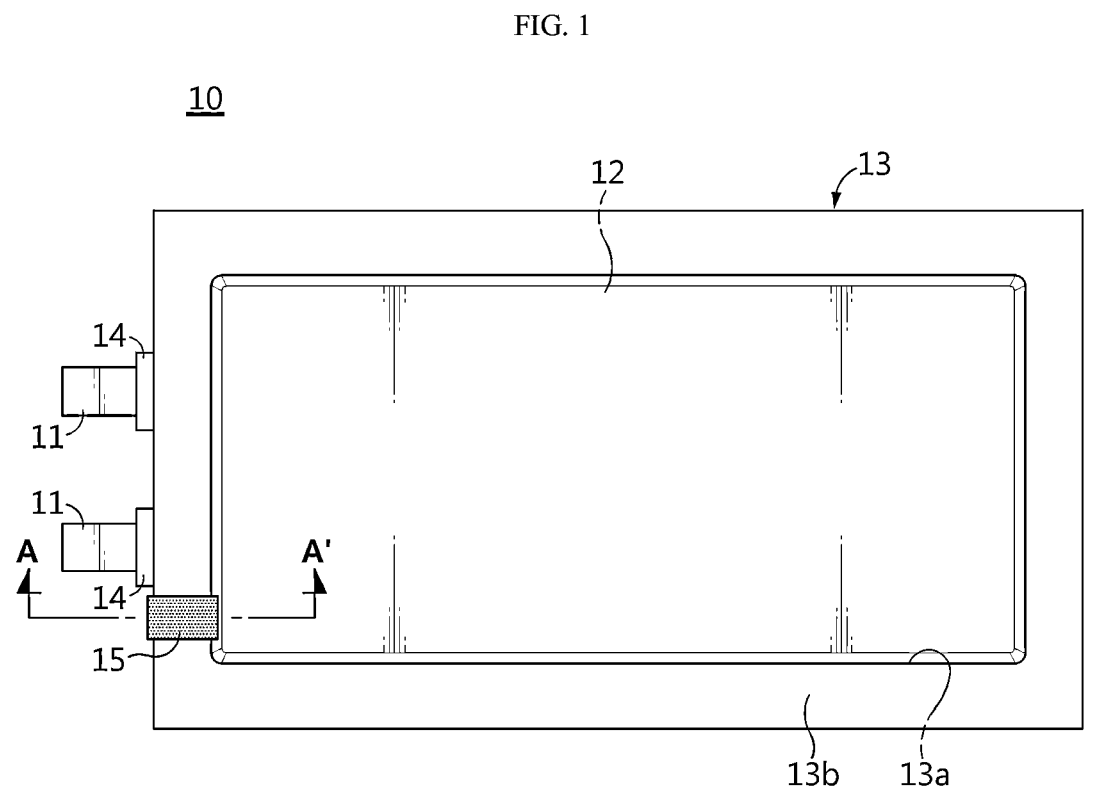

FIG. 1 shows a secondary battery 10 according to an embodiment of the present disclosure.

The secondary battery 10 includes an electrode assembly 12 to which an electrode lead 11 is attached, and a case 13.

The electrode assembly 12 includes a positive electrode plate, a negative electrode plate and a separator. In the electrode assembly 12, a positive electrode plate and a negative electrode plate may be sequentially laminated with a separator being interposed therebetween.

The positive electrode plate may include a positive electrode current collector made of a metal thin film having excellent conductivity—for example, an aluminum (Al) foil, and a positive electrode active material layer coated on at least one surface thereof. In addition, the positive electrode plate may include a positive electrode tab made of a metal material—for example, an aluminum (Al) material, at one side end thereof. The positive electrode tab may protrude from one side end of the positive electrode plate. The positive electrode tab may be welded to one side end of the positive electrode plate, or be bonded thereto using a conductive adhesive.

The negative electrode plate may include a negative electrode current collector made of a conductive metal thin film—for example, a copper (Cu) foil, and a negative electrode active material layer coated on at least one surface thereof. In addition, the negative electrode plate may include a negative electrode tab formed of a metal material—for example, a nickel (Ni) material, at one side end thereof. The negative electrode tab may protrude from one side end of the negative electrode plate. The negative electrode tab may be welded to one side end of the negative electrode plate, or be bonded thereto using a conductive adhesive.

The separator is interposed between the positive electrode plate and the negative electrode plate to electrically insulate the positive electrode plate and the negative electrode plate from each other. The separator may be a porous membrane so that lithium ions can pass between the positive electrode plate and the negative electrode plate. The separator may include, for example, a porous membrane using polyethylene (PE), or polypropylene (PP), or a composite film thereof.

An inorganic coating layer may be provided on the surface of the separator. The inorganic coating layer may have a structure in which inorganic particles are bonded to each other by a binder to form an interstitial volume between the particles.

The electrode assembly 12 may be a jelly-roll (winding-type) electrode assembly having a structure in which long sheet-type positive and negative electrodes are wound with a separator being interposed therebetween, a stacked (stack-type) electrode assembly having a structure in which a plurality of positive and negative electrodes cut into units of a predetermined size are sequentially stacked with a separator being interposed therebetween, a stack/folding type electrode assembly having a structure in which bi-cells or full-cells where positive and negative electrodes of a predetermined unit are stacked with a separator being interposed therebetween are wound, or the like.

The case 13 serves to accommodate the electrode assembly 12.

In an embodiment of the present disclosure, the case 13 may include an accommodation portion 13*a* for accommodating the electrode assembly 12, and a sealing portion 13*b* formed to seal the electrode assembly 12 as shown in FIG. 1.

The sealing portion 13*b* may include a sealant resin, and the sealant resin may be fused along an outer circumference of the accommodation portion 13*a* to seal the electrode assembly 12.

In an embodiment of the present disclosure, the case 13 may be provided in a film form having a multilayer structure including an outer layer for protection against external impacts, a metal barrier layer for blocking moisture, and a sealant layer for sealing the case.

The outer layer may include a polyester-based film using polyethylene terephthalate (PET), polybutylene terephthalate, polyethylene naphthalate, polybutylene naphthalate, co-polyester, polycarbonate, nylon, or the like, and may be configured in a single layer or multiple layers.

The metal barrier layer may include aluminum, copper, or the like.

The sealant layer may include a sealant resin and may be formed in a single layer or multiple layers.

The sealant resin may include polypropylene (PP), acid-modified polypropylene (PPa), random polypropylene, ethylene propylene copolymer, or two or more thereof. The ethylene propylene copolymer may include, but is not limited to, ethylene-propylene rubber, ethylene-propylene block copolymer, and the like.

In an embodiment of the present disclosure, the case 13 may be in a pouch form.

The pouch-type case 13 may include an upper pouch and a lower pouch. When the case 13 includes an upper pouch and a lower pouch, after the upper pouch and the lower pouch are positioned so that the sealant resins thereof face each other, the facing sealant resins may be configured to be fused with each other by heat and pressure to seal the battery.

The fusion of the sealing portion 13*b* may be thermal fusion, ultrasonic fusion, or the like, but is not particularly limited as long as the sealing portion 13*b* can be fused.

The sealing portion 13*b* may be sealed on four or three peripheral sides of the battery case 13 in some embodiments. In the three-sided sealing structure, after the upper pouch and the lower pouch are formed on one pouch sheet, the boundary surface between the upper pouch and the lower pouch is bent so that the electrode assembly accommodation portions 13*a* formed on the upper pouch and the lower pouch overlap, and in this state, the edges of the remaining three sides are sealed except for the bending portion.

The electrode lead 11 may be accommodated in the case 13 so that a part thereof is exposed to the outside of the battery case 13 as shown in FIG. 1.

The secondary battery 10 according to an embodiment of the present disclosure includes a lead film 14. The lead film 14 surrounds a part of the outer surface of the electrode lead 11 and is interposed between the electrode lead 11 and the case 13. For example, the lead film 14 may be interposed between the electrode lead 11 and the sealing portion 13*b* of the case 13 in a region where the electrode lead 11 protrudes or extends away from the case 13 to help binding of the electrode lead 11 and the case 13.

Referring to FIG. 1, the secondary battery 10 according to an embodiment of the present disclosure includes a vent member 15. When thermal propagation occurs, the vent member 15 may induce gases to be discharged in a specific direction, thereby improving the safety of the battery.

FIG. 2 is a cross-sectional view, taken along the line A-A' of FIG. 1.

Referring to FIG. 2, the vent member 15 protrudes to the outside of the case 13, and one end of the vent member 15 protruding to the outside of the case 13 is joined to a case outer side 16. Here, the "case outer side" is to be distinguished from a part of the case 13 in the vicinity of which the vent member 15 protrudes, and is spaced apart from the part of the case 13 in the vicinity of which the vent member 15 protrudes by a predetermined interval. At this time, a part of the vent member 15 protruding to the outside of the case 13 may be bent, so that one end of the vent member 15 protruding to the outside of the case 13 may be joined to the case outer side 16.

Referring to FIGS. 1 and 2, one end of the vent member 15 protruding to the outside of the case 13 may be joined to the case outer side 16 corresponding to a region inside the accommodation portion 13*a* where the electrode assembly 12 is not located. That is, one end of the vent member 15 protruding to the outside of the case 13 may be joined to the case outer side 16 located in the region inside the accommodation portion 13*a* where the electrode assembly 12 is not located.

Figure 3:
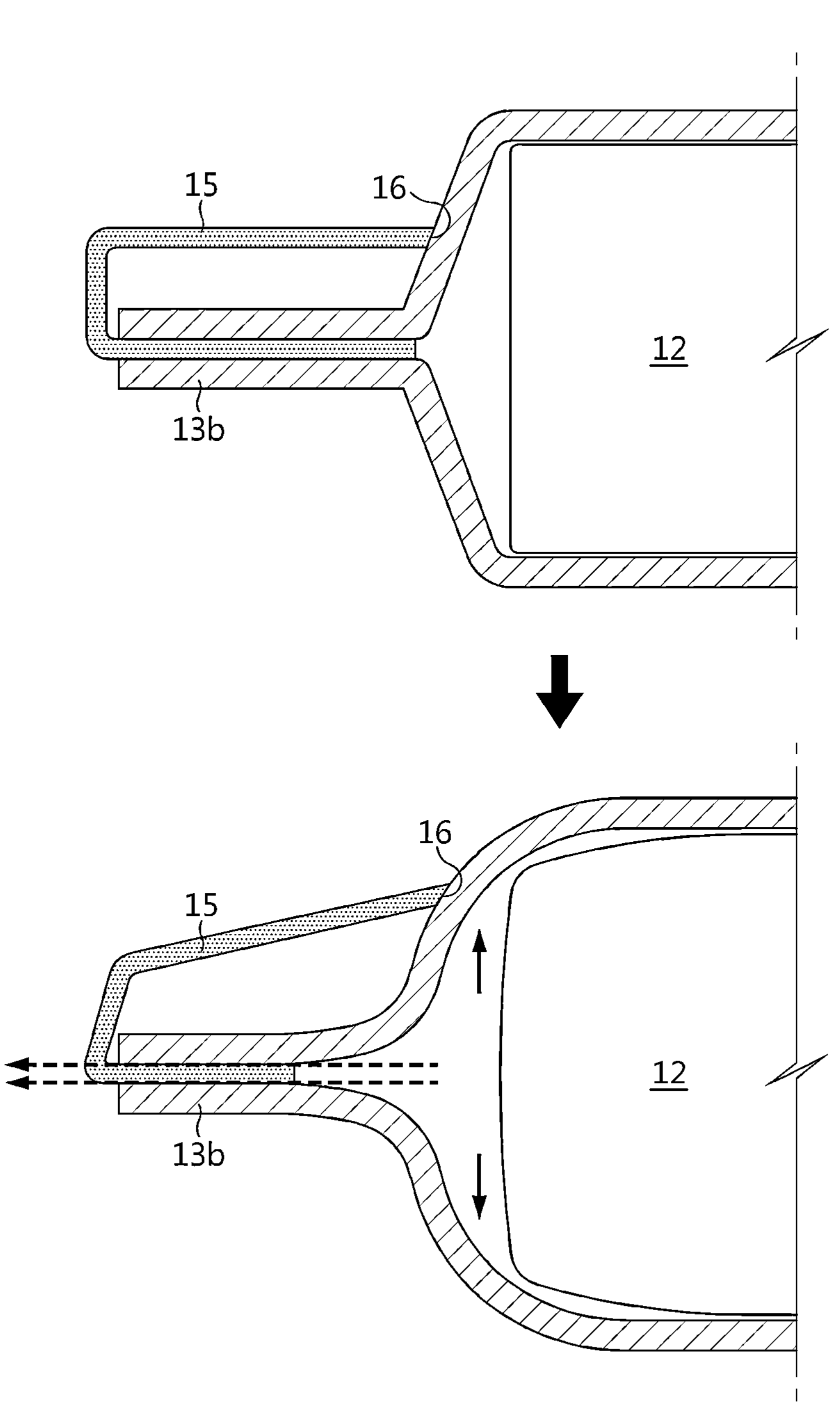
FIG. 3 is a diagram showing a state in which a vent occurs in the secondary battery according to an embodiment of the present disclosure.

FIG. 3 is a diagram showing a state in which a vent occurs in the secondary battery according to an embodiment of the present disclosure. Specifically, FIG. 3 is a cross-sectional view showing the vent member in the secondary battery according to an embodiment of the present invention.

Referring to FIG. 3, at a temperature at which the battery normally operates, the vent member serves to seal the case from the outside. If the temperature of the battery is excessively increased due to abnormal operation of the battery, gas is generated inside the battery, and thus when the battery swells, the case 13 also swells. As one end of the vent member 15 protruding to the outside of the case 13 is joined to the case outer side 16, the vent member 15 is pulled by the swollen case 13, so that the sealing strength of the part in which the vent member 15 is inserted is lowered. Accordingly, as the sealing strength of the part in which the vent member 15 is inserted is lowered, the vent may be guided to this portion.

At a side where the electrode lead 11 is exposed to the outside of the case 13, a certain empty space is formed between the electrode assembly 12 and the electrode lead 11. When gas is generated inside the battery, the gas may be concentrated in this empty space. When one end of the vent member 15 protruding to the outside of the case 13 is joined to the case outer side 16 corresponding to the region inside the accommodation portion 13*a* where the electrode assembly 12 is not located, the case outer side 16 corresponding to the region inside the accommodation portion 13*a* where the electrode assembly 12 is not located is particularly swollen more. Thus, the vent member 15 is pulled by the swollen case outer side 16, and the sealing strength of the part in which the vent member 15 is inserted may further deteriorate. Accordingly, the vent may be more easily induced.

Referring to FIGS. 1 and 2, the other end of the vent member 15 may be located in the sealing portion 13*b*.

Referring to FIGS. 1 and 2, the vent member 15 may be located in the sealing portion 13*b* at the side where the electrode lead 11 is exposed to the outside. At this time, the vent member 15 may be located in the sealing portion 13*b* next to the electrode lead 11, except for a region between the electrode leads 11. Specifically, the vent member 15 may be located in the sealing portion 13*b* at a corner where the electrode lead 11 is exposed to the outside.

When the vent member 15 is located in the sealing portion 13*b* next to the electrode lead 11, except for the region between the electrode leads 11, the amount of gas vented toward the side portion of the electrode lead 11 may be minimized, thereby further improving the safety of the battery. The electrode lead 11 is a component whose temperature rises rapidly in abnormal situations such as overcharge or internal short circuit. Therefore, if it is possible to improve the safety while minimizing direct contact between the vented gas and the electrode lead 11.

The vent member 15 can be attached to the case 13 by thermal fusion. In another example, the vent member 15 can be attached to the case 13 by an adhesive such as glue. In another example, the vent member 15 and the case 13 may be physically coupled to each other by means of a clip or the like. In another example, at least a part of the vent member may be embedded in a film constituting the case 13, for example a sealant resin.

In an embodiment of the present disclosure, the vent member 15 may have a lower melting point than the sealant resin. If the vent member 15 has a lower melting point than the sealant resin, the vent member 15 may melt faster than the sealant resin at a high temperatures. As the sealing strength of the part in which the vent member 15 is inserted is lower than the sealing strength of the case containing a sealant resin, the vent characteristics may be more easily implemented.

In an embodiment of the present disclosure, the vent member 15 may have a melting point of 100° C. to 130° C., or 105° C. to 125° C., or 110° C. to 120° C. If the melting point of the vent member 15 satisfies the above-mentioned range, the sealing strength of the part of the case 13 in which the vent member 15 is inserted may be lowered at a high temperature, for example 100° C. or higher, so that the venting characteristic may be readily implemented.

The melting point of the vent member 15 may be measured using a differential scanning calorimeter (DSC). For example, the temperature of a sample is increased from to 280° C. at 10° C./min, maintained at 280° C. for 10 minutes, cooled to 30° C. at 10° C./min, and then maintained at 30° C. for 10 minutes. Then, after increasing the temperature of the sample from 30° C. to 280° C. at 10° C./min, the melting point may be measured by maintaining the temperature at 280° C. for 10 minutes.

In an embodiment of the present disclosure, the vent member 15 may be vented at 100° C. to 120° C. to expel or exhaust gases from the accommodation portion to outside the secondary battery. In particular, the vent member 15 may be vented at a pressure of 100° C. to 120° C. and at a pressure of 1.5 atm or more. As the vent member 15 is vented in the aforementioned temperature range and/or the aforementioned pressure condition, it is possible to induce the gas to be discharged only during abnormal operation of the battery while sealing the battery during normal operation of the battery.

In an embodiment of the present disclosure, the vent member 15 may have a maximum sealing strength of less than 6 kgf/15 mm or less than 5 kgf/15 mm or less than 4.5 kgf/15 mm at 100° C. or higher. In another embodiment of the present disclosure, the vent member 15 may have a maximum sealing strength of less than 6 kgf/15 mm or less than 5 kgf/15 mm or less than 4.5 kgf/15 mm at 100° C. to 120° C. In another embodiment of the present disclosure, the vent member 15 may have a maximum sealing strength of less than 3 kgf/15 mm or less than 2 kgf/15 mm or less than 1 kgf/15 mm or less than 0.5 kgf/15 mm at 120° C. or higher. If the vent member 15 satisfies the above-mentioned sealing strength in the above-mentioned temperature range, the sealing strength of the part of the case 13 in which the vent member 15 is inserted may be lowered at a high temperature, for example 100° C. or higher, so that the vent characteristic may be readily implemented.

In an embodiment of the present disclosure, the vent member 15 may have a maximum sealing strength of 6 kgf/15 mm or more or 8 kgf/15 mm or more or 10 kgf/15 mm or more at room temperature to 60° C. If the vent member 15 satisfies the above-mentioned sealing strength in the above temperature range, even though the vent member 15 is inserted, the part of the case 13 in which the vent member 15 is inserted may have excellent sealing strength during normal operation of the battery, which may easily secure the sealing property of the battery.

In an embodiment of the present disclosure, the vent member 15 may have a maximum sealing strength of less than 6 kgf/15 mm at 100° C. or higher. The vent member may have a maximum sealing strength of 6 kgf/15 mm or more at room temperature to 60° C. If the vent member 15 satisfies the sealing strength described above, the sealing strength of the part of the case 13 in which the vent member 15 is inserted may be lowered at a high temperature, for example at 100° C. or higher, so that the vent characteristic may be readily implemented. In addition, since excellent sealing strength may be achieved during normal operation of the battery, the sealing property of the battery may be easily secured.

In an embodiment of the present disclosure, the vent member 15 may have an average sealing strength of less than 4.5 kgf/15 mm or less than 3 kgf/15 mm at 100° C. or above. In another embodiment of the present disclosure, the vent member 15 may have an average sealing strength of less than 4.5 kgf/15 mm or less than 3 kgf/15 mm at 100° C. to 120° C. In another embodiment of the present disclosure, the vent member 15 may have an average sealing strength of less than 2 kgf/15 mm or less than 1 kgf/15 mm or less than 0.5 kgf/15 mm at 120° C. or higher. If the vent member 15 satisfies the above-mentioned sealing strength in the above-mentioned temperature range, the sealing strength of the part of the case 13 in which the vent member 15 is inserted may be lowered at a high temperature, for example at 100° C. or higher, so that the vent characteristic may be implemented more easily.

In an embodiment of the present disclosure, the vent member 15 may have an average sealing strength of 4.5 kgf/15 mm or more or 5 kgf/15 mm or more or 6 kgf/15 mm or more or 7 kgf/15 mm or more at room temperature to 60° C. If the vent member 15 satisfies the above-mentioned sealing strength in the above temperature range, even though the vent member 15 is inserted, the part of the case 13 in which the vent member 15 is inserted may have excellent sealing strength during normal operation of the battery, which may easily secure the sealing property of the battery.

In an embodiment of the present disclosure, the vent member 15 may have an average sealing strength of less than 4.5 kgf/15 mm at 100° C. or above. The vent member 15 may have an average sealing strength of 4.5 kgf/15 mm or more at room temperature to 60° C. If the vent member 15 has the above-mentioned sealing strength in the above-described temperature range, the sealing strength of the part of the case 13 in which the vent member 15 is inserted may be lowered at a high temperature, for example at 100° C. or higher, so that the vent characteristic may be easily implemented. In addition, since the case 13 has excellent sealing strength during normal operation of the battery, the sealing property of the battery may be easily secured.

The sealing strength of the vent member 15 according to temperature may be measured by conducting a tensile test at a speed of 5 mm/min, after cutting the case 13 corresponding to the part in which the vent member 15 is inserted into a width of 15 mm and a length of 5 cm and then gripping both ends thereof using a UTM jig in a state where both ends are spread to 180°.

At this time, the maximum sealing strength means a maximum value when the case 13 is broken, and the average sealing strength means an average value when the case 13 is stretched by 8 mm at 4.5 kgf/15 mm when the maximum sealing strength is 4.5 kgf/15 mm or more and an average value when the case 13 is stretched by 8 mm at the maximum sealing strength when the maximum sealing strength is less than 4.5 kgf/15 mm.

In an embodiment of the present disclosure, the vent member 15 may include a linear low-density polyethylene having a comonomer with a carbon number of 6 or more. As the vent member 15 includes a linear low-density polyethylene having a comonomer with a carbon number of 6 or more, the sealing property of the case 13 is excellent in the normal temperature range, for example from room temperature to 60° C., and at a high temperature, for example 100° C. or above, the sealing strength of the case in which the vent member 15 is inserted is lowered, which may realize or cause venting.

In an embodiment of the present disclosure, the vent member 15 may include a linear low-density polyethylene having a comonomer with a carbon number of 6 to 8.

In an embodiment of the present disclosure, the linear low-density polyethylene having a comonomer with a carbon number of 6 or more may be polymerized in the presence of a metallocene catalyst. If the linear low-density polyethylene having a comonomer with a carbon number of 6 or more is polymerized in the presence of a metallocene catalyst, it may be more advantageous in terms of sealing strength and properties, compared to the case where it is polymerized in the presence of a Ziegler-Natta catalyst.

In an embodiment of the present disclosure, the content of the comonomer with a carbon number of 6 or more in the linear low-density polyethylene having a comonomer with a carbon number of 6 or more may be 15 weight % or less, or 12 weight % or less, or 11.8 weight % or less, or 10 weight % or less, or 9 weight % or less, or 8 weight % or less, or 7.6 weight % or less, based on 100 weight % of the linear low-density polyethylene having a comonomer with a carbon number of 6 or more. At the same time, it may be 5 weight % or more, or 7.6 weight % or more, or 8 weight % or more, or 9.0 weight % or more, or 10 weight % or more, or 11.8 weight % or more, or 12 weight % or more. If the content of the comonomer with a carbon number of 6 or more satisfies the above-mentioned range, it may be easy to ensure that the sealing strength is not lowered during normal operation of the battery due to a decreased packing density between molecules.

The content of the comonomer with a carbon number of 6 or more may be measured using an H-NMR. For example, after about 10 mg of a sample is completely dissolved in about 0.6 mL of trichloroethylene solvent using a heat gun, it may be sampled in an NMR tube and measured using the 1 H-NMR.

In an embodiment of the present disclosure, the linear low-density polyethylene having a comonomer with a carbon number of 6 or more may have a weight-average molecular weight of 100,000 g/mol to 400,000 g/mol, or 200,000 g/mol to 350,000 g/mol, or 230,000 g/mol to 300,000 g/mol. If the weight-average molecular weight of the linear low-density polyethylene having a comonomer with a carbon number of 6 or more satisfies the above-described range, the sealing strength with the sealant resin may be improved during normal operation of the battery.

In an embodiment of the present disclosure, the linear low-density polyethylene having a comonomer with a carbon number of 6 or more may have a poly dispersity index (PDI) of 4 or less, or 3.8 or less, or 3.796 or less, or 3.5 or less, or 3.023 or less, or 3 or less, or 2.7 or less, or 2.674 or less. In addition, the poly dispersity index (PDI) may be 1.0 or more. If the poly dispersity index of the linear low-density polyethylene having a comonomer with a carbon number of 6 or more satisfies the above range, the molecular weight distribution is narrow, so the sealing strength and the properties may be more excellent during normal operation of the battery.

The weight-average molecular weight and the poly dispersity index of the linear low-density polyethylene having a comonomer with a carbon number of 6 or more may be measured by gel permeation chromatography (GPC) under the following conditions:

column: Tosoh, HLC-8321 GPC/HT solvent: TCB (Trichlorobenzene)+0.04% BHT (after drying with 0.1% $CaCl_2$))

flow velocity: 1.0 ml/min sample concentration: 1.5 mg/ml dose: 300 μl column temperature: 160° C.

Detector: RI detector

Standard: Polystyrene (calibrated with a third-order function)

In an embodiment of the present disclosure, the crystallization temperature of the sealant resin and the crystallization temperature of the linear low-density polyethylene having a comonomer with a carbon number of 6 or more may be similar. For example, the difference between the crystallization temperature of the sealant resin and the crystallization temperature of the linear low-density polyethylene having a comonomer with a carbon number of 6 or more may be 10° C. or less, or 5° C. or less. In addition, the difference between the crystallization temperature of the sealant resin and the crystallization temperature of the linear low-density polyethylene having a comonomer with a carbon number of 6 or more may be 0.1° C. or more. If the difference between the crystallization temperature of the sealant resin and the crystallization temperature of the linear low-density polyethylene having a comonomer with a carbon number of 6 or more satisfies the above range, the sealant resin and the linear low-density polyethylene having a comonomer with a carbon number of 6 or more may have improved fusion characteristic during normal operation of the battery.

In an embodiment of the present disclosure, the linear low-density polyethylene having a comonomer with a carbon number of 6 or more may have a crystallization temperature of 90° C. to 115° C., or 95° C. to 110° C., or 100° C. to 110° C., or 105° C. to 110° C. If the crystallization temperature of the linear low-density polyethylene having a comonomer with a carbon number of 6 or more satisfies the above range, the sealant resin and the linear low-density polyethylene having a comonomer with a carbon number of 6 or more may have improved fusion characteristics.

In an embodiment of the present disclosure, the difference between the crystallization temperature of the sealant resin and the crystallization temperature of the linear low-density polyethylene having a comonomer with a carbon number of 6 or more may be 10° C. or less, and the crystallization temperature of the linear low-density polyethylene having a comonomer with a carbon number of 6 or more may be 90° C. to 115° C.

The crystallization temperature may be measured using a differential scanning calorimeter (DSC). For example, the temperature of the sample may be increased from to 280° C. at 10° C./min, maintained at 280° C. for 10 minutes, cooled to 30° C. at 10° C./min, and then maintained at 30° C. for 10 minutes. Then, after increasing the temperature of the sample from 30° C. to 280° C. at 10° C./min, the crystallization temperature may be measured by maintaining the temperature at 280° C. for 10 minutes.

In an embodiment of the present disclosure, the vent member 15 may have various shapes so that the gas is easily directed toward the vent region. For example, the vent member 15 may have a film shape.

The vent member 15 may be formed to have a predetermined thickness of a preset magnitude. Moreover, the vent member 15 may be inserted into the case 13 so that the insertion length can be varied or the venting pressure and position can be controlled depending on the design. Here, the insertion length of the vent member 15 means a maximum value of the distance between one end and the other end of the vent member 15 based on the protruding direction of the electrode lead 11.

In an embodiment of the present disclosure, the vent member 15 may further include an adhesive layer for smoother placement.

In an embodiment of the present disclosure, the secondary battery may be a cylindrical, prismatic, or pouch-type secondary battery. Among them, the secondary battery may be a pouch-type secondary battery.

Hereinafter, the present disclosure will be explained in more detail with reference to exemplary embodiments. This disclosure may, however, be embodied in many different forms and should not be construed as limited to the exemplary embodiments set forth therein. It will be apparent that these exemplary embodiments are provided so that the present disclosure will be complete and understood easily by those skilled in the art.

What is claimed is:

1. A secondary battery, comprising:

an electrode assembly;

a case accommodating the electrode assembly therein; and a vent member, wherein the vent member protrudes to an outside of the case at a first location, and one end of the vent member protruding to the outside of the case is joined to an outer side of the case at a second location that is spaced apart from the first location, wherein the case includes an accommodation portion for accommodating the electrode assembly and a sealing portion containing a sealant resin and is formed to seal the electrode assembly within the case, and the one end of the vent member protruding to the outside of the case is joined to the outer side of the case corresponding to a region inside the accommodation portion where the electrode assembly is not located.

2. The secondary battery according to claim 1, wherein a part of the vent member protruding to the outside of the case is bent so that the one end of the vent member protruding to the outside of the case is joined to the outer side of the case.

3. The secondary battery according to claim 1, wherein the other end of the vent member is located in the sealing portion.

4. The secondary battery according to claim 3, wherein an electrode lead is attached to the electrode assembly, and the other end of the vent member is located in the sealing portion at a side of the case where the electrode lead is exposed to the outside.

5. The secondary battery according to claim 3, wherein an electrode lead is attached to the electrode assembly, and the other end of the vent member is located in the sealing portion at a corner of the case adjacent to where the electrode lead is exposed to the outside.

6. The secondary battery according to claim 1, wherein the vent member has a lower melting point than the sealant resin, and wherein the melting point of the vent member is between 100° C. and 130° C.

7. The secondary battery according to claim 1, wherein the vent member is vented at a temperature between 100° C. and 120° C., and/or wherein the vent member is vented at a pressure of 1.5 atm or above.

8. The secondary battery according to claim 1, wherein the vent member has a maximum sealing strength of less than 6 kgf/15 mm at 100° C. or above.

9. The secondary battery according to claim 1, wherein the vent member has an average sealing strength of less than 4.5 kgf/15 mm at 100° C. or above.

10. The secondary battery according to claim 1, wherein the vent member has a maximum sealing strength of greater than 6 kgf/15 between room temperature and 60° C.

11. The secondary battery according to claim 1, wherein the vent member has an average sealing strength of 4.5 kgf/15 mm or more between room temperature and 60° C.

12. The secondary battery according to claim 1, wherein the vent member contains a linear low-density polyethylene having a comonomer with a carbon number of 6 or more.

13. The secondary battery according to claim 12, wherein the linear low-density polyethylene having a comonomer with a carbon number of 6 or more is polymerized in the presence of a metallocene catalyst.

14. The secondary battery according to claim 12, wherein in the linear low-density polyethylene having a comonomer with a carbon number of 6 or more, a content of the comonomer with a carbon number of 6 or more is 15 weight % or less, based on 100 weight % of the linear low-density polyethylene having a comonomer with a carbon number of 6 or more.

15. The secondary battery according to claim 12, wherein the linear low-density polyethylene having a comonomer with a carbon number of 6 or more has a poly dispersity index (PDI) of 4 or less.

16. The secondary battery according to claim 12, wherein the case includes a sealing portion containing a sealant resin and is formed to seal the electrode assembly within the case, and a difference between a crystallization temperature of the sealant resin and a crystallization temperature of the linear low-density polyethylene having a comonomer with a carbon number of 6 or more is 10° C. or less.

17. The secondary battery according to claim 16, wherein the linear low-density polyethylene having a comonomer with a carbon number of 6 or more has a crystallization temperature of 90° C. to 115° C.

18. The secondary battery according to claim 12, wherein the linear low-density polyethylene having a comonomer with a carbon number of 6 or more has a weight-average molecular weight of 100,000 g/mol to 400,000 g/mol.

19. The secondary battery according to claim 1, wherein the secondary battery is a pouch-type secondary battery.

* * * * *